US011032409B1

(12) United States Patent
Venkatakrishnan et al.

(10) Patent No.: US 11,032,409 B1
(45) Date of Patent: Jun. 8, 2021

(54) METHODS FOR GEOGRAPHIC GESTURING USING A MOBILE DEVICE FOR INTERACTIONS WITH NEARBY OTHER MOBILE DEVICES

(71) Applicant: yellCast, Inc., San Carlos, CA (US)

(72) Inventors: Ganesan Venkatakrishnan, San Carlos, CA (US); William Foster, Santa Fe, NM (US); Peter Ellenby, Portland, OR (US); Thomas William Ellenby, San Jose, CA (US)

(73) Assignee: YELLCAST, INC, San Carlos, CA (US)

( * ) Notice: Subject to any disclaimer, the term of this patent is extended or adjusted under 35 U.S.C. 154(b) by 0 days.

(21) Appl. No.: 16/908,627

(22) Filed: Jun. 22, 2020

Related U.S. Application Data (60) Provisional application No. 62/903,631, filed on Sep. 20, 2019.

(51) Int. Cl.
| | |
|---|---|
| *H04M 1/7243* | (2021.01) |
| *H04W 4/029* | (2018.01) |
| *G06F 3/01* | (2006.01) |
| *H04W 4/80* | (2018.01) |
| *H04W 84/12* | (2009.01) |

(52) U.S. Cl.
CPC .......... *H04M 1/7243* (2021.01); *G06F 3/017* (2013.01); *H04W 4/029* (2018.02); *H04W 4/80* (2018.02); *H04W 84/12* (2013.01)

(58) Field of Classification Search
CPC ... H04M 1/7243; H04W 4/029; H04W 84/12; H04W 4/80; G06F 3/017
See application file for complete search history.

(56) References Cited

U.S. PATENT DOCUMENTS

| | | | | |
|---|---|---|---|---|
| 10,257,291 | B1* | 4/2019 | Matiash | H04L 67/22 |
| 2011/0032145 | A1* | 2/2011 | Hansen | G01S 5/0063 |
| | | | | 342/357.34 |
| 2014/0365485 | A1* | 12/2014 | Kim | G06Q 50/01 |
| | | | | 707/736 |
| 2019/0361950 | A1* | 11/2019 | Ganesan | G06F 9/451 |
| 2020/0225760 | A1* | 7/2020 | Ofir | A61B 5/11 |

\* cited by examiner

*Primary Examiner* — Marcos L Torres
(74) *Attorney, Agent, or Firm* — Haynes and Boone, LLP; Philip H. Albert (57) ABSTRACT

Interacting between users of mobile devices is provided by initiating a desired interaction at a first user device using a gesture sensed by the first user device, determining a gesture area, submitting a desired interaction request for interaction with associated users within the gesture area, and sending a notification to user devices indicating the desired interaction of the first user with one or more users of a local subset, wherein the notification identifies the first user with an identifier independent of identifiers used by the first user outside of interactions with a remote server.

9 Claims, 7 Drawing Sheets

METHODS FOR GEOGRAPHIC GESTURING USING A MOBILE DEVICE FOR INTERACTIONS WITH NEARBY OTHER MOBILE DEVICES

FIELD OF THE INVENTION

The present disclosure generally relates to gesturing with mobile devices. The disclosure relates more particularly to apparatus and techniques for performing geographically based gesturing and corresponding social actions and interactions.

CROSS-REFERENCE TO PRIORITY AND RELATED APPLICATION

This application claims priority from and is a non-provisional of U.S. Provisional Patent Application No. 62/903,631, filed Sep. 20, 2019, entitled "Methods of Point of Interest Data Creation, Geographic Gesture Based Verification, Social, Commerce and Security Actions and Interactions, Using Spatially-Aware Mobile Computing Devices." The entire disclosure of the application recited above is hereby incorporated by reference, as if set forth in full in this document, for all purposes.

BACKGROUND

Mobile devices have become, in places, ubiquitous and provide their users with information and connectivity. Some devices even find uses for effecting transactions with other nearby devices.

Improvements in geographically based interactions might be useful.

SUMMARY

A method of interacting between users of mobile devices is provided, comprising initiating a desired interaction at a first user device using a gesture sensed by the first user device, determining a geographic location for the desired interaction based on a location of the first user device, determining, from the gesture, a gesture area, submitting, from the first user device to a remote server, a desired interaction request wherein the desired interaction request comprises an indication of the gesture or the gesture area, searching, at the remote server, for a membership record associated with a first user of the first user device, searching, at the remote server, for relationship records associated with a set of one or more associated users associated with the first user, determining locations for user devices associated with users of the set of one or more associated users, determining membership of a local subset of the set of one or more associated users, wherein the local subset comprises associated users associated with the first user having user devices with present locations within the gesture area, determining remote server identifiers for the first user and for the users of the local subset, and sending a notification to user devices of the local subset, the notification indicating the desired interaction of the first user with one or more users of the local subset, wherein the notification identifies the first user with an identifier independent of identifiers used by the first user outside of interactions with the remote server.

Determining an orientation of the gesture or of the first user device might be done and deriving the gesture area based on the orientation. The gesture might comprise a movement of the first user device in a forward arcing movement, wherein the forward arcing movement defines an orientation and an initial size of the gesture area. Adjusting from the initial size of the gesture area might be based on location details. Adjusting from the initial size of the gesture area based on the location details might comprise adjusting based on a determined size of a venue that contains the geographic location.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As described herein, a user of a mobile device can perform an action or movement that the mobile device interprets as a geogesture, a gesture tied to a particular geographic position (location, altitude, orientation, etc.) and in response to detecting a gesture, taking a local geographically based action and/or initiating an interaction. Interactions could use more secure methods of communication for users of applications and systems that provide information transfers between members of such applications and systems while retaining the confidentiality of each user's information and limiting the availability of such information to other users of the system.

Using smart mobile devices, and other devices, users can take local geographically based actions and engage in interactions that are initiated by and based upon a physical gesture of a mobile device, generally a mobile phone or a tablet. A gesture might be deemed to have been made upon detection of particular movements or actions as might be determined by the mobile device's accelerometers, gyroscopes or other internal sensors used to determine a device's spatial state and/or motion, combined with that device's real world position as sensed by the mobile device's positioning sensors such as GPS, AGPS or other position sensing technology and the device's compass bearing (pointing direction) as determined by the mobile device's compass or other means of determining pointing direction. For example, by monitoring the compass and accelerometers of the mobile device, or other sensors that record the spatial situation of mobile devices such as smart phones and tablets, the mobile device can initiate a local geographically based action and/or interaction in a specific direction according to a user making a casting motion, much like a motion of casting a fishing rod, with their device. Other gestures, such as a side-to-side slashing motion, may also initiate geographically based actions and interactions in 360 degrees around a user. The actions and/or interactions may be in relation to points of interest ("POIs") that fall within a defined geographic area defined by the gesture. These POIs can be real world objects, such as buildings, restaurants, parks etc., mobile objects such as people, animals and vehicles, or virtual objects such as a geolocated gaming object. The various actions might be referred to as a "geogesture" of a mobile device. The geogesture might trigger the mobile device to take a geographically based action and/or interaction in relation to specific POIs (objects, including a people) within the defined geographic area associated with the geogesture. The mobile device might create a data object for a geogesture, with data elements for the geographic area of the geogesture, the nature of the geogesture, and other details as explained herein.

Figure 1:
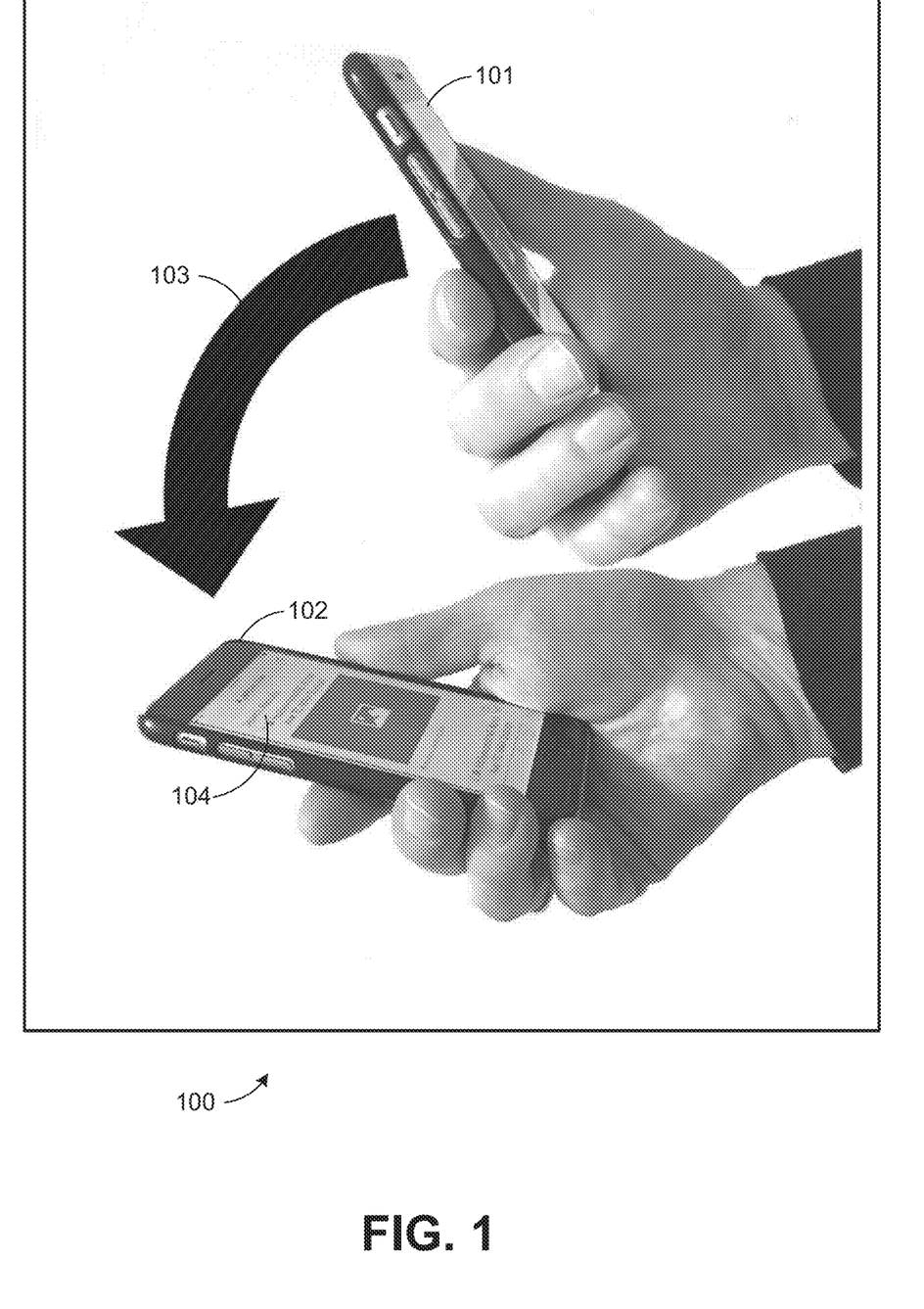
FIG. 1 is an image illustrating the physical motion of a gesture that can be interpreted as a cast or an act of casting.

FIG. 1 is an image 100 illustrating the physical motion of a cast. In FIG. 1, a mobile phone is shown in two positions, at the start of a cast 101 and the end of a cast 102. The motion between the two positions is shown as an arrow 103. As shown, the motion is in the vertical plane. In some implementations, motion in the horizontal plane may trigger a cast. This motion may be registered as the rate of change through the angle traversed, the actual angular change, or a combination of the two. The results of the search for the cast then may be displayed on the screen 104 of the electronic device. If the motion does not meet a threshold (e.g., rate of change of angular motion) in the horizontal and/or vertical planes, the motion may not register as a cast and thus the motion may be ignored. The threshold may be pre-defined or pre-set. In one or more implementations, the threshold is dynamically determined based on typical movement of the device.

In a specific example, a user of a mobile device having an app or functionality of geogesturing might find themselves in a city with bars and restaurants. From a place near a bar of possible interest, the user might geogesture towards the bar using their mobile device. This might cause the mobile device to generate a geogesture data object, look up data based on a location area element of the geogesture data object and display information about points of interest within that location area, presumably including the bar of possible interest. The mobile device can use that geogesture data object and query a remote server that can return details of the user's friends who are noted in a database at the remote server and who's devices have indicated that they are presently within the location area. A social network might be set up among those friends, where the user's friends have allowed the social network, or other friend finder app, to track their location and include them as POIs that may be interacted with. The user can then send a group message, facilitated perhaps by the remote server, to the friends. The geogesture data object might be used for a more complex query, such as identifying how many of the user's contacts are in each different establishment that falls within the location area.

In another example, the user is already within an environment and notes a group of interesting people across the room. The user can initiate a geogesture towards the group and the query with the remote server can return data as to which of those people are within the group and on the same social network or networks as the user, and who have allowed the social network to track their location and include them as POIs in the user database. It may be the case that all of those who meet the criteria are displayed to the user and the user may then initiate actions, including but not limited to, profile views and friend requests. It may also be the case that only those who have a mutual friend in common, or other similar attribute including but not limited to, same college, work experience or musical taste, with the user are shown to the user. Then the user may initiate actions and interactions with them as previously described or other actions and interactions such as text chatting or sending a photograph through the social network. It may also be the case that those who were geogestured at may have to approve that their profile be shown to the user who initiated the interaction. They would be shown who the user was and then they may approve that actions or interactions occur or they may choose to initiate an action or interaction with the user. Similarly, if the user were to initiate a 360-degree geogesture at the same party, the guests within the defined area of the geogesture who fit the previously defined parameters would be available for the user to interact with in the same methods as previously described. Users of the system who have approved being in the POI database may have user profiles that allow other users who geogesture at them to interact with them in a predefined manner, including but not limited to filtering not at all, or filtering by demographics.

Instead of a remote server, a peer-to-peer network might be used, or a system with distributed data records, such as a blockchain system. The peer-to-peer network might be, for example, a Wi-Fi Direct™ network, a Bluetooth-based network, etc.

Figure 2:
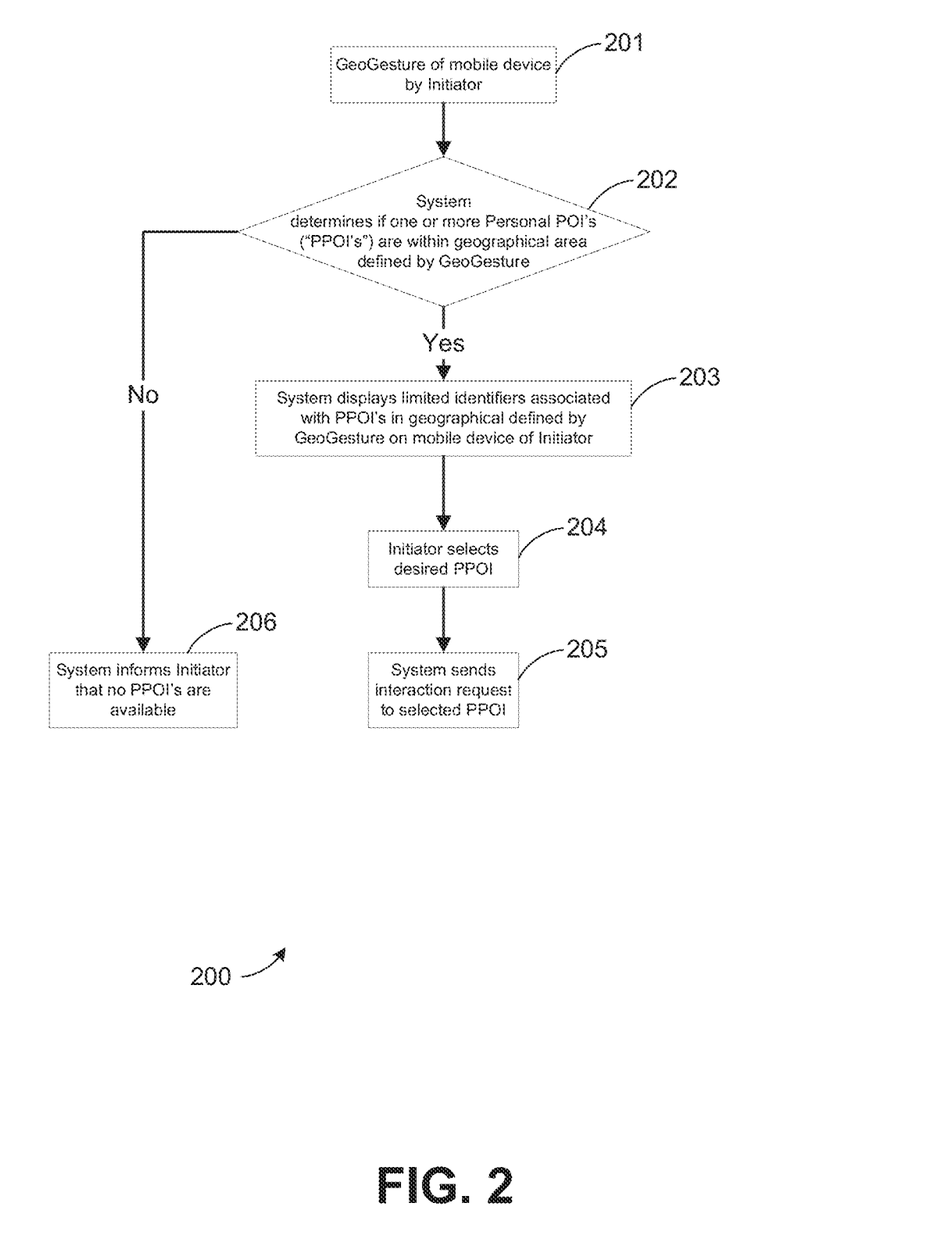
FIG. 2 is a flowchart illustrating a possible mode of operation of the system.

FIG. 2 is a flowchart 200 illustrating a possible mode of operation of a social interaction (the "POI server system") initiated with a geogesture. In step 201, an initiator of an interaction, who is a user of the POI server system, geogestures at a group of people with their mobile device. The flowchart then branches to step 202. In step 202, the POI server system determines if the location of one or more Personal POIs ("PPOIs") associated with members of the same social or professional network, or a subset of that social or professional network such as a friends group, as the initiator are located within the geographical area defined by the geogesture of the initiator's mobile device. If one or more PPOIs are not located within the geographical area, the flowchart branches to step 206 in which the POI server system informs the initiator that no PPOIs are available for interaction. If one or more PPOIs are located within the geographical area, the flowchart branches to step 203.

In step 203, the POI server system displays a limited identifier, such as a picture, first name, etc., associated with each PPOI within the geographical area on the mobile device of the initiator. The flowchart then branches to step 204. In step 204, the initiator selects the desired PPOI that they would like to interact with. The flowchart then branches to step 205. In step 205, the POI server system sends an interaction request to the social network member associated with the selected PPOI.

Figure 3:
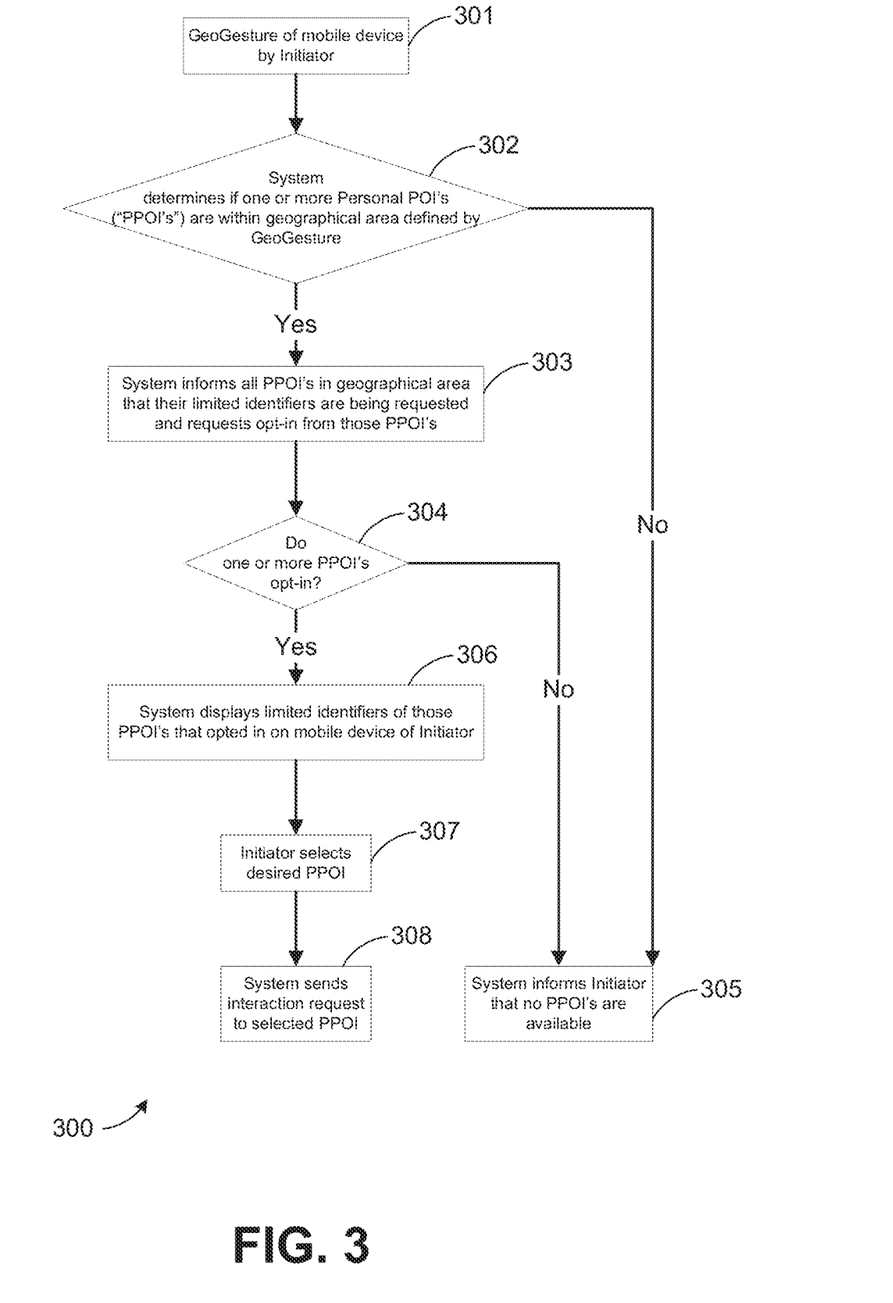
FIG. 3 is a flowchart of an advanced mode of operation of the system.

FIG. 3 is a flowchart 300 illustrating a more advanced possible mode of operation of a social interaction initiated with a geogesture using the POI server system. In step 301, the initiator geogestures at a group of people with their mobile device. The flowchart then branches to step 302. In step 302, the POI server system determines if the location of one or more PPOIs associated with members of the same social and/or professional network, or a subset of that social or professional network such as a friends group, as the initiator are located within the geographical area defined by the geogesture of the initiators mobile device. If one or more PPOIs are not located within the geographical area the flowchart branches to step 305 in which in which the POI server system informs the initiator that no PPOIs are available for interaction. If one or more PPOIs are located within the geographical area the flowchart branches to step 303. In step 303, the POI server system informs members whose PPOI location is within the geographical area that their limited identifiers, such as a picture, first name, etc., are being requested and requests opt-in from each such members. The flowchart then branches to step 304. In step 304, the POI server system determines if one or more such members opt-in. If one or more such members do not opt-in the flowchart branches to step 305 in which the POI server system informs the initiator that no PPOIs are available for interaction. If one or more such members do opt-in, the flowchart branches to step 306. In step 306, the POI server system displays the limited identifier associated with each member that opted on the mobile device of the initiator. The flowchart then branches to step 307. In step 307, the initiator selects the desired PPOI that they would like to interact with. The flowchart then branches to step 308. In step 308, the POI server system sends an interaction request to the social network member associated with the selected PPOI.

For the next example of the system in use we have a user who is in Battery Park at the southern tip of Manhattan. They are looking at the Statue of Liberty and would like to post on social media that they are looking at the famous statue. A typical social media app on a phone or a tablet would simply check the user's location and would suggest that they post that they are in Battery Park, not that they are looking at the Statue of Liberty. The user might initiate a geogesture towards the Statue of Liberty and then the system could post to social media that the user was indeed looking at the Statue of Liberty. The system could also suggest various photos of the statue that could be added to the social media post that was initiated by the geogesture.

Other actions that could take place on a social network platform initiated by a geogesture could include other features. For example, a user selects a photograph from their library, and they would like to virtually attach the photograph to an object in the real world. They would geogesture at the object, such as a statue in a park, and then they select the statue from the list of POIs presented to them to attach the photo to. When others view information about the statue on the social network the user's photo that was attached to the statue with a geogesture will be visible. They could perform similar geogesture interactions, including but not limited to, attaching text, such as a review, to a POI, or attaching virtual gaming objects to real world POIs.

For a further example of the system in use a user might see an old friend from a distance at a convention. If the user wants to see what they have been up to, instead of having to search for their profile, even though they are already connected, the user can geogesture at their friend, who has allowed the social network to track their location and become a POI, and their friend's profile is then automatically shown to the user.

Another action the user could have initiated with a geogesture in the previous example would have been to identify his friend with a geogesture and send them their digital business card or contact information, along with their current geo-location, therefore alerting their friend that they were at the same convention and giving them a means to contact them. They could also initiate a chat with their friend after sending the information or initiate a chat after the geogesture identification without having to send any information.

For a further example of the system in use, a user might arrive at a county fair. The fairgrounds are quite large, and the user was looking forward to connecting with other friends who are also attending the fair. Once inside the fairgrounds, the user initiates a side-to-side slash geogesture that results in a 360-degree search area that is also confined to the fairgrounds. The result of the geogesture search shows that five of the user's friends are within the fairgrounds and the user then sends out a request for the users to all join a group chat while they are attending the fair. They all accept and begin to communicate and connect using the group chat set up on the remote server through the geogesture. Once this group has been established, it could be used to form a micro POI database and the users could also track the group and even initiate pointing geogestures towards their friends to interact with them. Messages may be sent only to members of the group who are in a certain direction and those messages could be transmitted using a geogesture. It is possible that friends of the user who arrive at the fairgrounds after the group has been established would be invited to join the group. It may also be the case that a user automatically leaves the group once they depart the confines of the fairgrounds. It may also be the case that the group may grow from the user's friends inviting their friends, friends that are not friends with the initial creator of the group, who are at the fair to join the group.

Real-Time Gesture Based Digital Handshake Methods

In another advanced version of the system, the interaction between participants may be controlled at the server level via a digital key or via a cloud-based distributed blockchain ledger. In the case of two people wanting to connect and message, and without asking for the other person's phone number, email, social IDs etc., a connection is made possible. At any point in time, either user can disconnect with no trace of actual contact information remaining on either participant's device.

This is in contrast to traditional methods such as sharing contact cards, usernames, phone numbers via text (email/SMS), in-app requests (e.g., social media or professional network access), speech (simply telling someone your number or username and having them physically enter it) or even the exchange of a business card.

Users may create multiple profiles based on application and usage, e.g., for friends, family, sport teams, a specific event, personal, or professional. These profiles may be preset or could be created/modified on the fly for each specific instance. A simple method for creating or modifying such profiles would be to have a list of possible information (social media ID, or other professional or social media applications, phone number, personal and professional snapchat, etc.) each with a switch or checkbox that could be clicked to approve that particular information being included in that communication with that person at that time or saved in that profile. A user of the system may also be presented with basic pre-set profiles for the most likely categories of contact (social, work, weekend, vacation, etc.) and these basic profiles may then be modified by the user to suit their personal preferences.

With the ability to identify users in close proximity via gesturing, the need for a phone number, email address, username, etc. becomes unnecessary. The system can maintain a much more highly secure lengthy digital ID that is internal to the system server database or web based blockchain hash. The system can then maintain the contact relationships as configured by the user in their profiles and as specifically shared. In addition, an updated database of individual contacts/relationships could also be compiled at a central server or via a distributed blockchain enabling a user to save specific user profiles of approved contact information relating to specific users of the system that have been interacted with previously. These system user specific profiles may be updated or modified by the user as desired. In this way, the user would be able to develop a set of contact information bookmarks specific to other users of the system.

After significant universal adoption, these methods may completely eliminate the need for public visibility of phone number, email, thereby offering privacy, security and prevent spam, robocalls, etc.

These methods of generating and modifying profiles and saving and sharing contact information via server/blockchain may also eliminate the need to manually update such information on the other user's local phone whenever such information changes. For example, suppose a user A changes their primary email address and a user B desires to send an email to user A. User A's email address on user B's phone may simply be identified as "Work E-mail." Via the system server, the email would automatically be sent to the new primary email of user A seamlessly, and without user B needing to know the change of email address.

This method of contact and connection enables short term/long term contactless private and secure connections. And with the ability to disconnect without a trace, this can be highly useful for dating and friendship connections in the real world. A significant advantage of this method includes frictionless addition of contact information for everyday use.

The contact information to be sent may also be defined by a pre-set profile relating to the identity of the participant being geogestured at or the relationship of the participant being geogestured at to the user. It is often the case that a person has multiple methods of contact that either correspond to work, personal or other areas. It may be beneficial to be able to share only the pertinent information from a user's contact file with another user based on the nature of the relationship between the two users. When geogesturing towards a user with a connection or potential connection through a social network of a non-professional type, only the user's personal contact information would be shared, and if the users were connected or potentially connected through a professional social network, the user's work contact information might be shared with the other user.

For example, suppose user A geogestures at user B. The system can determine that user B is not known to user A socially, but does have a similar profession as user A. The system may then suggest a specific profile of business-related contact information, etc. (social media ID, company email, etc.) to be made available by user A to user B.

It also may be the case that sharing contact information through a geogesture with multiple people would be beneficial, and also the contact information shared with each user within the geogesture area of interest could correspond to the relationship each user had with the sending user. For example, while attending a convention, a user of the system notices a coffee shop across the street and begin to walk towards the shop. While walking, they geogesture towards the coffee shop to share their contact information with any potential contacts or friends. They have told the system to share work contact information with attendees of the convention who are venture capitalists (VCs) since they are seeking funding for a new venture, and to share their personal contact information with anyone they have a connection or potential connection with on non-professional social media. After the user geogestures towards the coffee shop, if a VC receives the user's work contact information, one of its employees, who is connected to the user through a non-professional social network might receive the user's personal contact information. This demonstrates how one geogesture may connect with multiple users and yet only share the relevant information with each user based upon individual connection parameters. Profiles/information to be made available may also be modified by (1) location (e.g., one or both users remain within a defined geographical area, such as at a convention), (2) proximity (the contact information might only be available to user A if they are within a distance threshold of user A or the location of user A when the contact was made and once this distance threshold is exceeded, all trace of the contact information, etc. might be deleted), and/or (3) time (the contact information might be only available for a set amount of time from initial contact or expires at a set time of day), etc. An application could be developed that leverages public profile APIs from social media services or transaction services, and aggregates them within a single peer-to-peer app. A user could create an account and then link their profiles on these social networks to it. If two users were logged into such an application and visible, to connect to each other in the app they could connect on those platforms if they were in close proximity to each other with the actual contact being controlled at the server level and specific contact information being kept confidential at the server level.

Figure 4:
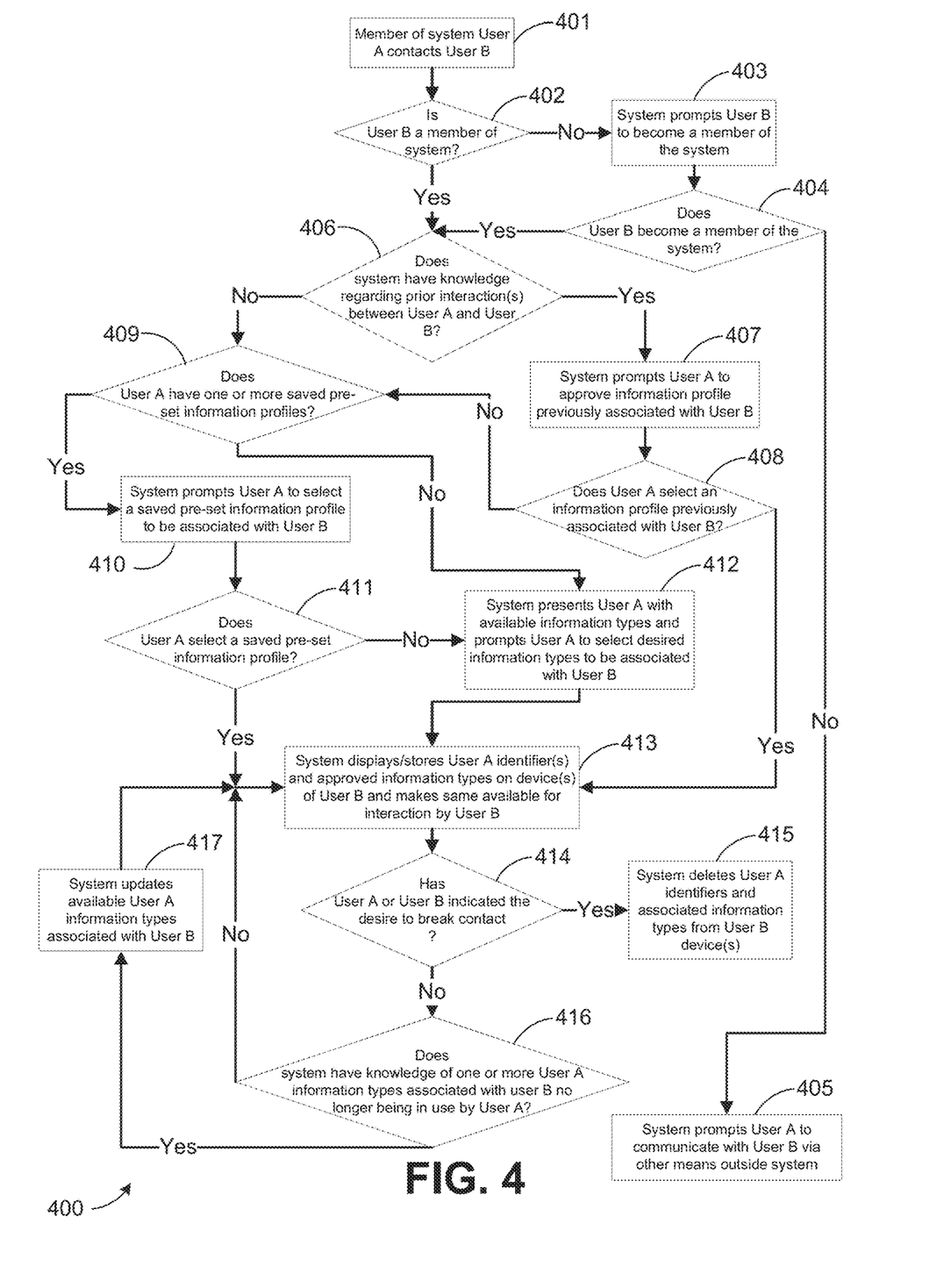
FIG. 4 is a flowchart of another advanced mode of operation of the system.

FIG. 4 is a flowchart 400 illustrating a possible mode of operation of a handshake system that provides secure and anonymous information sharing/communication system. In step 401, User A, who is a member of the handshake system contacts User B. This contact may be made via a cast/pointing as described in FIGS. 1 and 2 and associated text, via email, text or SMS, or other means. The flowchart then branches to step 402. In step 402, the handshake system determines if User B is known to the handshake system. In the case of a geogesture being used for contact, the location and hence a POI associated with User B would be known to the handshake system, User B might not be a user of the handshake system. If a text, email, or other contact means were being utilized for the initial contact, the location of User B would not have to be known to the handshake system for contact to be initiated. If User B is not a user of the handshake system, the flowchart then branches to step 403. If User B is a user of the handshake system, the flowchart then branches to step 406. In step 403, the handshake system prompts User B to become a user of the handshake system.

This prompting to become a user of the handshake system may be accomplished in a variety of ways including, but not limited to, an invite to join that is included in the initial contact message or sent as a second message, a prompt by the system to download an application to User B's mobile device, etc. User B may then go through the steps of becoming a user of the handshake system so as to facilitate the secure communication etc. between the two parties. The flow then branches to step 404, in which the handshake system determines if User B has become a user of the handshake system. If User B has become a user of the handshake system, the flow then branches to step 406. If User B has not become a user of the handshake system, the flow then branches to step 405, at which the handshake system prompts User A to communicate with User B via means outside the handshake system. In step 406, the handshake system determines if the handshake system has knowledge regarding prior interactions between User A and User B. If the handshake system does have knowledge regarding prior interactions between User A and User B, then the flow branches to step 407. If the handshake system does not have knowledge regarding prior interactions between User A and User B, then the flow branches to step 409. In step 407, the handshake system prompts User A to approve an information profile previously associated with User B. An information profile may contain one or more information types, such as email addresses, social media ID's, passwords or access codes, etc. that User A may want to make available to User B. The flow then branches to step 408, in which the handshake system determines if User A has selected a profile previously associated with User B. If User A has selected a profile previously associated with User B, the flow then branches to step 413 via connector 3. If User A has not selected a profile previously associated with User B, the flow then branches to step 409. In step 409, the handshake system determines if User A has one or more saved pre-set information profiles.

These profiles may be, for example, associated with types of social connection (friend, work, etc.) or other criteria. If User A does have one or more saved pre-set information profiles, the flow branches to step 410. If User A does not have one or more saved pre-set information profiles, the flow branches to step 412. In step 410, the handshake system prompts User A to select a saved pre-set information profile to be associated with User B. The flow then branches to step 411, in which the handshake system determines if User A has selected a saved pre-set information profile to be associated with User B. If User A does select a saved pre-set information profile, the flow branches to step 413 via connector 1. If User A does not select a saved pre-set information profile, the flow branches to step 412. In step 412, the handshake system presents User A with available information types and prompts User A to select the desired information types to be associated with User B. The flow then branches to step 413 via connector 2. In step 413, the handshake system stores and displays the approved information types in association with User A's identifiers (picture, name, etc.) on User B's device and makes those information types available for interaction by User B.

If, for example, User A had made their personal email address and social media ID available to User B as an information type, all that might be displayed to User B could be User A's identifiers and, perhaps, simple buttons titled "personal email" and "social media #1" and not the actual email address or ID. The approved information types etc. to be associated with User A may be stored at the server level, in a distributed cloud system or as part of a blockchain ledger, rather than on the mobile device of User B.

The flow then branches to step 414. In step 414, the handshake system determines if User A or User B has indicated a desire to break contact with the other. If User A or User B has indicated a desire to break contact with the other, then the flow branches to step 415 in which the handshake system deletes User B's access to User A's identifiers and associated information types and vice versa. If User A or User B has not indicated a desire to break contact with the other, then the flow branches to step 416. In step 416, the handshake system determines if one or more User A information types associated with User B are no longer in use by User A. If one or more such information types was no longer in use by User A, the flow then branches to step 417, in which the handshake system updates User A information types associated with User B and hence available for interaction on User B's devices. For example, if User A had deleted their particular social media account, then the interactive button for User A's account would be removed from User B's devices. If all such information types are still in use by User A, the flow then branches back to step 413.

Figure 5:
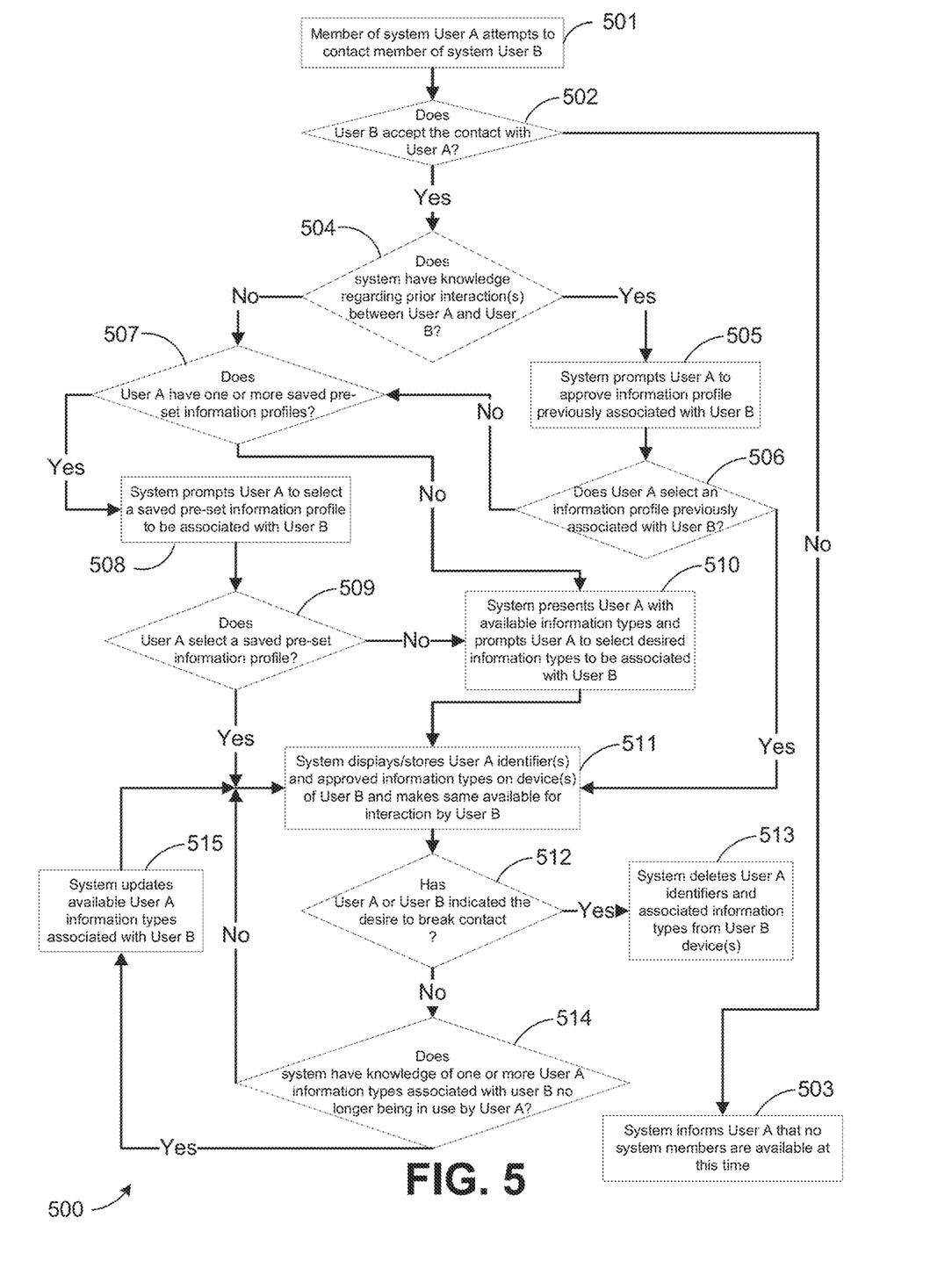
FIG. 5 is a flowchart of yet another advanced mode of operation of the system.

FIG. 5 is flowchart 500 illustrating a possible mode of operation of a "handshake system initiated by a geogesture. In step 501, User A, who is a user of the handshake system, attempts to contact User B, also a user of the handshake system, via a geogesture. The flow then branches to step 502. In step 502, the handshake system determines if User B accepts the contact with User A. If User B does not accept the contact with User A, the flow then branches to step 503, in which the handshake system may inform User A that either a) there are no available system users in the area geogestured at (in this case User B has rejected the contact, but User A is not informed of the rejection), or b) user B has rejected the contact with User A.

The type of response received by User A may be a handshake system default (such as option "a" above in which User A receives no response from the handshake system) or may be selectable by User B (user B may wish user A to know that the contact request has been rejected). If User B does accept the contact with User A, the flow then branches to step 504. In step 504, the handshake system determines if the handshake system has knowledge regarding prior interactions between User A and User B. If the handshake system does have knowledge regarding prior interactions between User A and User B, then the flow branches to step 505. If the handshake system does not have knowledge regarding prior interactions between User A and User B, then the flow branches to step 507. In step 505, the handshake system prompts User A to approve an information profile previously associated with User B. An information profile may contain one or more information types, such as email addresses, social media ID's, passwords, or access codes, etc. that User A may want to make available to User B.

The flow then branches to step 506, in which the handshake system determines if User A has selected a profile previously associated with User B. If User A has selected a profile previously associated with User B, the flow then branches to step 511 via connector 6. If User A has not selected a profile previously associated with User B, the flow then branches to step 507. In step 507, the handshake system determines if User A has one or more saved pre-set information profiles. These profiles may be, for example, associated with types of social connection (friend, work, etc.) or other criteria. If User A does have one or more saved pre-set information profiles, the flow branches to step 508. If User A does not have one or more saved pre-set information profiles, the flow branches to step 510.

In step 508, the handshake system prompts User A to select a saved pre-set information profile to be associated with User B. The flow then branches to step 509, in which the handshake system determines if User A has selected a saved pre-set information profile to be associated with User B. If User A does select a saved pre-set information profile, the flow branches to step 511 via connector 4. If User A does not select a saved pre-set information profile, the flow branches to step 510. In step 510, the handshake system presents User A with available information types and prompts User A to select the desired information types to be associated with User B. The flow then branches to step 511 via connector 5. In step 511, the handshake system stores and displays the approved information types in association with User A's identifiers (picture, name, etc.) on User B's device and makes those information types available for interaction by User B.

If, for example, User A had made their personal email address and social media ID available to User B as an information type, all that would be displayed to User B would be User A's identifiers and, perhaps, simple buttons titled "personal email" and "social media" and not the actual email address or ID. The approved information types etc. to be associated with User A may be stored at the server level, in a distributed cloud system or as part of a blockchain ledger rather than on the mobile device of User B.

The flow then branches to step 512. In step 512, the handshake system determines if User A or User B has indicated a desire to break contact with the other. If User A or User B has indicated a desire to break contact with the other, then the flow branches to step 513 in which the handshake system deletes User B's access to User A's identifiers and associated information types and vice versa. If User A or User B has not indicated a desire to break contact with the other, then the flow branches to step 514. In step 514, the handshake system determines if one or more User A information types associated with User B are no longer in use by User A. If one or more such information types was no longer in use by User A, the flow then branches to step 515, in which the handshake system updates User A information types associated with User B and hence available for interaction on User B's devices. For example, if User A had deleted their particular social media account, then the interactive button for User A's social media ID would be removed form User B's devices. If all such information types are still in use by User A, the flow then branches back to step 511.

The methods described and illustrated in FIGS. 4 and 5 and related text need not be mutually exclusive and may be combined if desired.

Follows are possible specific examples of a handshake system and uses thereof.

Payment System Example 1

Connecting two users via a payment network or other payment applications using payment network ID's to enable a person-to-person payment might be done with User A sending a payment request to user B. User A selects their personal identifier (e.g., photograph, name, etc.) and payment network ID as the information to be shared via the system with user B's device. Via a geogesture, user B could be automatically presented with the payment request from the person in front of them and then a payment could be made. This transaction could be a one-time transaction, or the payee could be added to the payer's contact list for future payments but that the actual payment network ID of user A is not known to user B and is instead held at the server level. Even if the payee was already in the contact list, a geogesture could be simpler.

Payment System Example 2

Take a group of people who are at a location in proximity to each other and are willing to pay all or some of an expense such as a dinner bill. One of them geogestures at the other. The information about the matched PPOI is presented to the requesting user seeking a payment request, after getting a confirmation from the user that was geogestured at. Then the requesting user could make the payment. Alternately, the requesting user may make a payment with pointing after the confirmation is done by the responding user. In both these scenarios, the person who responds to the geogesture confirms they intend to share their profile information through the system in order to complete the transaction.

Some implementations of payment apps do reveal profile information to the other user in order to be searched and found. Using the method described in here, by geogesturing and with the user's permissions, their profiles can be connected for a transaction without the users actually seeing the ID. Users may only see a name and photo instead to confirm the matched results with the person in front of them.

Payment System Example 3

In a social network example, a user might request a connection with someone on a professional social network.

Figure 6:
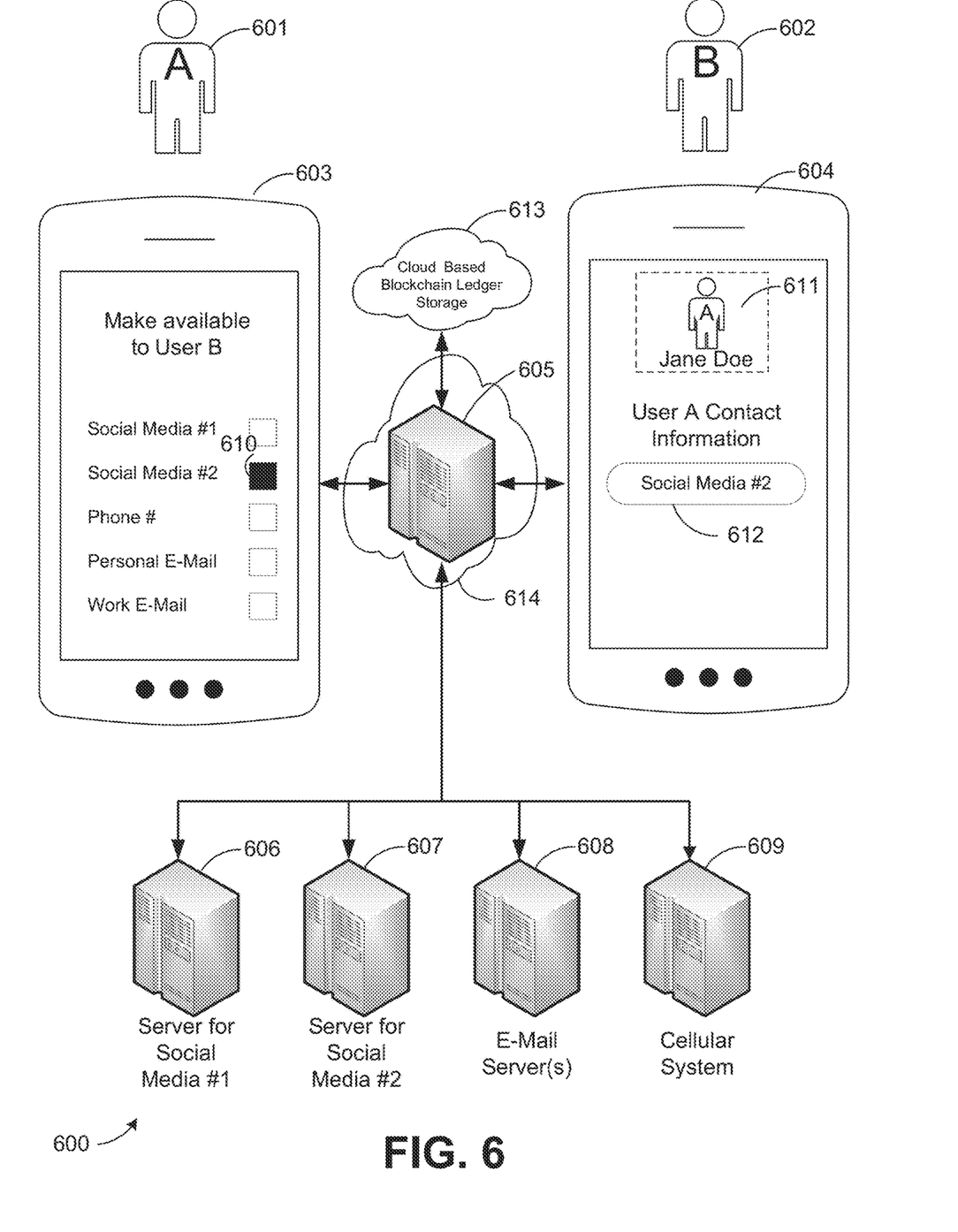
FIG. 6 is a diagram illustrating methods of the system in operation via mobile devices.

FIG. 6 is a diagram 600 illustrating a possible mode of operation of the system in such a situation. User A 601 desires to connect with user B 602 via that network. User A 601 selects their personal identifier (e.g., photograph, avatar, name, username, etc.) 611 and ID, by selecting the checkbox 610 associated with that network on the display of User A's mobile device 603, as the information to be shared via the system with user B's device 604. Via a geogesture, or other contact step, User B 602 could be presented with the contact request from the person in front of them and, if they approve the request, User A's personal identifier 611 (in this case an avatar and the name "Jane Doe") and a button 612 associated with User A's social media ID would be added to user B's profile of user A and displayed on User B's mobile device 604.

This profile may be held either at the system server 605 level, on User B's mobile device 604, as a cloud based 613 blockchain ledger entry maintained by networked systems, or a combination thereof. The system server 605 has been given proxy access, by User A, to User A's various information types (in this case a first social media ID 606, a professional social media ID 607, various email servers 608 and the cellular system 609) that User A subscribes to, is a member of, etc. and therefore the system server 605 may facilitate communications via that social media network between User A and User B.

The actual social media ID of user A need not be known to user B, and vice versa, and can instead be held at the server level. The graphics being shown as displayed on the mobile devices 603 and 604 can be stylized and are used for illustrative purposes only. Different user interfaces or graphical user interfaces may instead be displayed. System server 605 may be one or more dedicated physical servers or may be a distributed cloud-based processing system 614.

These methods of holding information at server or cloud level and only making such information available to User B upon authorization from User A, and not making the actual information accessible to the users of such mobile devices, can apply beyond contact information such as email address, social media ID, financial system ID, etc. Other information that may be shared via such a system may include wireless network passwords, security codes to access physical areas or databases, meeting requests, and other data.

While the methods described above are illustrated in conjunction with a physical gesture of a mobile device, such as a geogesture, as an initiator of contact between participants the methods as described in FIG. 4 and associated text and elsewhere herein, they could be applicable to other means of interaction, such as near-field (Bluetooth, etc.), Wi-Fi, both devices on same local network, email, SMS, etc. These methods may enable a member of the system to set up, in effect, a "My Private Account" and if such a system was used for interaction between individuals and retailers such a system could in effect eliminate unwanted email, since the retailer would never have access to the actual email address, etc. of members of the system and hence would not be able to sell that information to aggregators.

If a user of the system wishes to message a person or group, they can open a system app and click on the contact (less) list instead of opening each individual app and messaging via those apps. An advantage of such a system could be that if a user of the system wishes to send a message to User A on one messaging platform and User B on another messaging platform, they can do that at once without opening individual apps separately and retyping/pasting the same information multiple times. Such a system can abstract the contact selection, and method of communication as chosen by the recipient for each of their contacts.

Smart watches and other wearables capable of sensing motions may be used to initiate a contactless handshake by gesturing or pointing at a nearby person with the arm on which the wearable device is present, pressing a button to confirm identity, and then generating a blink and/or beep on the wearable device, or mobile device such as a smart phone associated with the wearable device, of the person being gestured at. The responding person may then confirm the contact request by pushing a button on the wearable device or associated mobile device. Given the limited display size of most such wearable devices an audible (sound), tactile (vibration), or overt visual display (flashing lights) may be the desired method of initial interaction and/or confirmation with such devices.

In addition, existing methodologies of sharing contact information, etc. between devices and particularly mobile devices are typically very power hungry requiring the transmission of large data packets over wireless links. By holding the detailed information at the server level, only giving access of such information to the device via a secure key or blockchain hash, and executing the requested transaction at the server level the need to transmit large data packets is kept to a minimum.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices, or any other device that incorporates hard-wired and/or program logic to implement the techniques.

Figure 7:
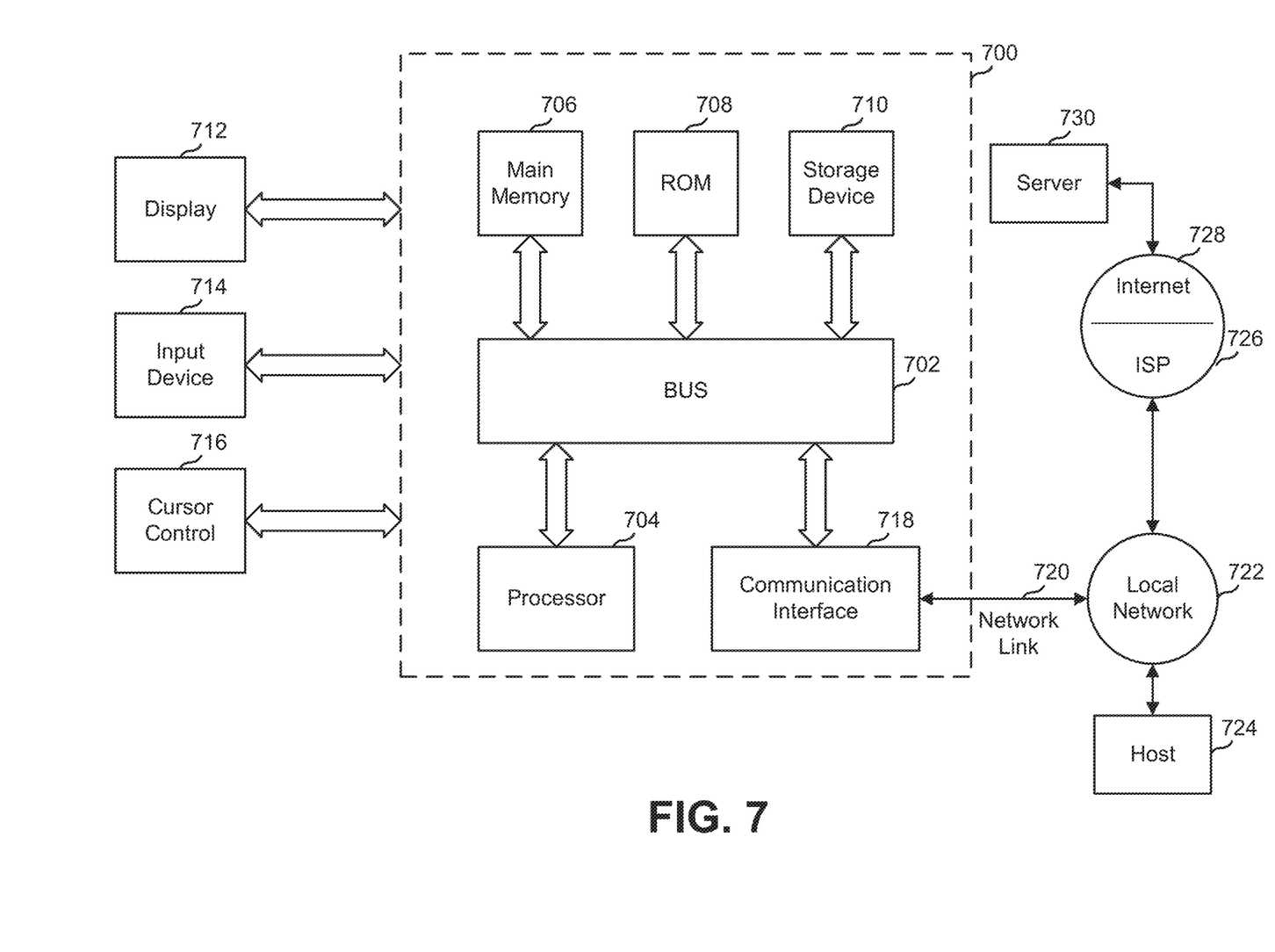
FIG. 7 is a block diagram of computer elements as might be used.

For example, FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of interacting between users of mobile devices, comprising:
    initiating a desired interaction at a first user device using a gesture sensed by the first user device;
    determining a geographic location for the desired interaction based on a location of the first user device;
    determining, from the gesture, a gesture area;
    submitting, from the first user device to a remote server, a desired interaction request wherein the desired interaction request comprises an indication of the gesture or the gesture area;
    searching, at the remote server, for a membership record associated with a first user of the first user device;
    searching, at the remote server, for relationship records associated with a set of one or more associated users associated with the first user;
    determining locations for user devices associated with users of the set of one or more associated users;
    determining membership of a local subset of the set of one or more associated users, wherein the local subset comprises associated users associated with the first user having user devices with present locations within the gesture area;
    determining remote server identifiers for the first user and for the users of the local subset; and sending a notification to user devices of the local subset, the notification indicating the desired interaction of the first user with one or more users of the local subset, wherein the notification identifies the first user with an identifier independent of identifiers used by the first user outside of interactions with the remote server.

2. The method of claim 1, further comprising:
determining an orientation of the gesture or of the first user device; and
deriving the gesture area based on the orientation.

3. The method of claim 1, wherein the gesture comprises a movement of the first user device in a forward arcing movement, wherein the forward arcing movement defines an orientation and an initial size of the gesture area.

4. The method of claim 3, further comprising adjusting from the initial size of the gesture area based on location details.

5. The method of claim 4, wherein adjusting from the initial size of the gesture area based on the location details comprises adjusting based on a determined size of a venue that contains the geographic location.

6. A method of interacting between users of mobile devices, comprising:
initiating a desired interaction at a first user device using a gesture sensed by the first user device;
determining a geographic location for the desired interaction based on a location of the first user device;
determining, from the gesture, a gesture area;
submitting, from the first user device to a coordinating system, a desired interaction request wherein the desired interaction request comprises an indication of the gesture or the gesture area;
searching, at the coordinating system, for a membership record associated with a first user of the first user device;
searching, at the coordinating system, for relationship records associated with a set of one or more associated users associated with the first user;
determining locations for user devices associated with users of the set of one or more associated users;
determining membership of a local subset of the set of one or more associated users, wherein the local subset comprises associated users associated with the first user having user devices with present locations within the gesture area;
determining coordinating system identifiers for the first user and for the users of the local subset; and
sending a notification to user devices of the local subset, the notification indicating the desired interaction of the first user with one or more users of the local subset, wherein the notification identifies the first user with an identifier independent of identifiers used by the first user outside of interactions with the coordinating system.

7. The method of claim 6, wherein the coordinating system is one or more of a remote server, a peer-to-peer network, and/or a system with distributed data records.

8. The method of claim 7, wherein the system with distributed data records is a blockchain system.

9. The method of claim 7, wherein the peer-to-peer network is one or more of a Wi-Fi Direct™ network and/or a Bluetooth-based network.

\* \* \* \* \*